(12) United States Patent
Golob et al.

(10) Patent No.: US 10,132,628 B2
(45) Date of Patent: Nov. 20, 2018

(54) AERIAL REFUELING BOOM ELEVATION ESTIMATION SYSTEM

(71) Applicant: THE BOEING COMPANY, Chicago, IL (US)

(72) Inventors: Richard Golob, Shoreline, WA (US); Justin Cleve Hatcher, Seattle, WA (US); Jung Soon Jang, Bellevue, WA (US); Kimberly Ann Hinson, Seattle, WA (US); Jeffrey L. Musgrave, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 525 days.

(21) Appl. No.: 14/640,878

(22) Filed: Mar. 6, 2015

(65) Prior Publication Data

US 2016/0258750 A1 Sep. 8, 2016

(51) Int. Cl.
| | |
|---|---|
| *G01C 9/00* | (2006.01) |
| *B64D 39/00* | (2006.01) |
| *G01C 25/00* | (2006.01) |
| *G01C 9/02* | (2006.01) |

(52) U.S. Cl.
CPC ............ *G01C 9/005* (2013.01); *B64D 39/00* (2013.01); *G01C 9/02* (2013.01); *G01C 25/005* (2013.01)

(58) Field of Classification Search
CPC ................................. G01C 9/005; G01C 9/02
USPC ........................................................ 702/154
See application file for complete search history.

(56) References Cited

U.S. PATENT DOCUMENTS

| | | | |
|---|---|---|---|
| 3,285,544 A | 11/1966 | Chope et al. | |
| 4,072,283 A | 2/1978 | Weiland | |
| 4,129,270 A | 12/1978 | Robinson et al. | |
| 6,966,525 B1 | 11/2005 | Schroeder | |
| 7,246,774 B2 | 7/2007 | Von Thal et al. | |
| 7,469,863 B1 * | 12/2008 | Speer ................... | B64D 39/00 244/135 A |
| 7,472,868 B2 | 1/2009 | Schuster et al. | |
| 8,439,311 B2 | 5/2013 | Richardson, Jr. | |
| 8,485,474 B2 | 7/2013 | Cutler | |
| 8,579,233 B2 | 11/2013 | Richardson | |
| 8,596,580 B1 | 12/2013 | Barmichev et al. | |
| 2003/0205643 A1 | 11/2003 | von Thal et al. | |
| 2006/0074558 A1 | 4/2006 | Williamson et al. | |
| 2008/0265097 A1 | 10/2008 | Stecko et al. | |
| 2012/0104171 A1 | 5/2012 | Martinez Vásquez et al. | |
| 2012/0136604 A1 | 5/2012 | Hsieh et al. | |

(Continued)

FOREIGN PATENT DOCUMENTS

| | | |
|---|---|---|
| EP | 2687444 A1 | 1/2014 |
| EP | 2349840 B1 | 8/2014 |

(Continued)

OTHER PUBLICATIONS

European Patent Office Extended European Search Report, Application No. 16158950.2-1754, dated Jul. 12, 2016.

*Primary Examiner* — Anthony Ho
(74) *Attorney, Agent, or Firm* — Toler Law Group, P.c.

(57) ABSTRACT

An aerial refueling boom elevation estimation ("ARBEE") system for estimating an elevation angle of an aerial refueling boom on an aerial refueling aircraft is described. The ARBEE system may include a data collector, storage unit, optimizer, and comparator.

20 Claims, 10 Drawing Sheets

(56) References Cited

U.S. PATENT DOCUMENTS

2014/0042274 A1 2/2014 Hatcher
2014/0203174 A1 7/2014 Skinner et al.

FOREIGN PATENT DOCUMENTS

WO WO 2010059155 A1 5/2010
WO WO 2010065036 A1 6/2010

* cited by examiner

AERIAL REFUELING BOOM ELEVATION ESTIMATION SYSTEM

STATEMENT REGARDING FEDERALLY SPONSORED RESEARCH AND DEVELOPMENT

This invention was made with United States Government ("USG") support. The government has certain rights in the invention.

BACKGROUND OF THE INVENTION

1. Field of the Invention

The present disclosure is generally related to aerial refueling booms and more particularly to systems and methods for estimating the elevation of an aerial refueling boom.

2. Related Art

Aerial refueling aircraft utilize refueling booms to transfer fuel from tanks within the refueling aircraft to an aircraft receiving the fuel while in-flight. Turning to FIG. 1, an example of an implementation of a known approach to refuel a receiving aircraft 100 with an aerial refueling aircraft 102 utilizing an aerial refueling boom 104 is shown. In this example, the aerial refueling boom 104 is pivotally mounted at one end 106 to the aerial refueling aircraft 102. The aerial refueling boom 104 typically includes a telescoping nozzle with a connector 108 at the opposite end of the aerial refueling boom 104. The nozzle connector 108 connects to a corresponding receptacle on the receiving aircraft 100. The aerial refueling boom 104 may be pivotally mounted to the aerial refueling aircraft 102 via gimbal type structure and the aerial refueling boom 104 may be lowered from and raised to the aerial refueling aircraft 102 via a combination of control surfaces 110 (that typically include elevator and rudder surfaces) and a hoist-cable 112. Once connected, fuel is transferred from the tanks within the aerial refueling aircraft 102 to the receiving aircraft 100 via the aerial refueling boom 104.

Generally, aerial refueling booms (such as aerial refueling boom 104) are designed to rotate upwards to the tail 114 of the aerial refueling aircraft 102 for stowage in a position that does not interfere with functioning of the aerial refueling aircraft 102 during operations and to minimize drag on the aerial refueling aircraft 102 when the aerial refueling boom 104 is not in use. As described earlier, during refueling operations, typical aerial refueling booms (such as aerial refueling boom 104) are designed to rotate downwards to a position for mating with the receiving aircraft 100 and for transferring fuel. To aid in the process of mating the aerial refueling boom 104 nozzle connector 108 to the receiving aircraft 100, the aerial refueling boom 104 may include the control surfaces 110 mounted to the aerial refueling boom 104. These control surfaces 110 may be manipulated by an operator aboard the aerial refueling aircraft 102 using a flight control stick ("FCS") in order to "fly" (i.e., move and position) the aerial refueling boom 104 so as to guide, and align the nozzle connector 108 with the receptacle of the receiving aircraft 100, and then stow the aerial refueling boom 104. Additionally, the aerial refueling boom 104 may be extended and retracted utilizing an aerial refueling boom actuator utilizing a telescope control stick ("TCS"). Moreover, in addition to the control surfaces 110, the hoist-cable 112 is a secondary and/or auxiliary system for stowing the aerial refueling boom 104.

Unfortunately, known implementations of these types of systems are generally susceptible to a single point failure when moving the aerial refueling boom 104. Specifically, known aerial refueling boom systems utilize aerial refueling boom elevation and roll tilt axis inclination sensors that are quad-electric but dual-mechanical sensors. As such, in an example of a failure in the system, one sensor may have a mechanical shaft failure within the sensor and produce incorrect sensor outputs that will be the same for channel A and channel B. As a result, when comparing the channel A and channel B of the "bad" sensor to the channel A and channel B of the "good" sensor, the A/B channels of each sensor will agree but it will not be possible to know which sensor is correct.

As such, there is a need for a system and method that will allow accurate sensor measurements of the position of an aerial refueling boom when a sensor failure occurs in the system.

SUMMARY

An aerial refueling boom elevation estimation ("AR-BEE") system for estimating an elevation angle of an aerial refueling boom on an aerial refueling aircraft is described. The ARBEE system may include a data collector, storage unit, optimizer, and comparator.

In this example, the data collector may be in signal communication with the storage unit, a plurality of inertial measurement units ("IMUs"), a cable length sensor, a plurality of aerial refueling boom position sensors, and a dynamic pressure sensor. The storage unit may also be in signal communication with the optimizer and the comparator and the optimizer may also be in signal communication with the comparator. The data collector is configured to receive measured data signals from the plurality of IMUs, the cable length sensor, aerial refueling boom position sensors, and the dynamic pressure sensor and send the measured data from the received measured data signals to a first database in the storage unit. The measured data may include measured aerial refueling boom elevation data, measured aerial refueling boom azimuth data, measured dynamic pressure data, and measured hoist cable length data corresponding to a measured aerial refueling boom elevation angle, measured aerial refueling boom azimuth angle, measured dynamic pressure exerted on the aerial refueling boom, and measured hoist cable length of a hoist cable coupled between a hoist on the aerial refueling aircraft and the aerial refueling boom, respectively. The optimizer is configured to receive the measured data from the first database, optimize it, and store it as optimized data in a second database in the storage unit and the optimized data may include optimized aerial refueling boom elevation estimation data that corresponds to a predicted aerial refueling boom elevation angle that was derived from the measured data. The comparator is configured to determine the difference between the optimized aerial refueling boom elevation estimation data and the measured aerial refueling boom elevation data to determine an elevation data error, compare the elevation data error to a predetermined threshold value, and send error information to the optimizer if the elevation data error is greater than the predetermined threshold value. The optimizer is configured to utilize the error information to further optimize the estimation data and store it as updated optimized data in the second database. In this example, the elevation angle of the aerial refueling boom is determined from the optimized data.

In an example of operation, the ARBEE system may perform a method that includes collecting measured data signals from the plurality of IMUs, the cable length sensor, aerial refueling boom position sensors, and the dynamic pressure sensor and generating the first database of measured data corresponding to the collected measured data signals. The ARBEE system then optimizes the measured data of the first database to create the second database of optimized data corresponding to the measured data, wherein the measured data includes measured aerial refueling boom elevation data and wherein the optimized data includes optimized aerial refueling boom elevation estimation data. The ARBEE system then compares the optimized data to the measured data to determine the difference between the optimized aerial refueling boom elevation estimation data and the measured aerial refueling boom elevation data to determine the elevation data error and then determines if the elevation data error is greater than the predetermined threshold value. If the elevation data error is greater than the predetermined threshold value, the ARBEE system then updates the optimized data and utilizes the optimized data to determine the elevation angle of the aerial refueling boom.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
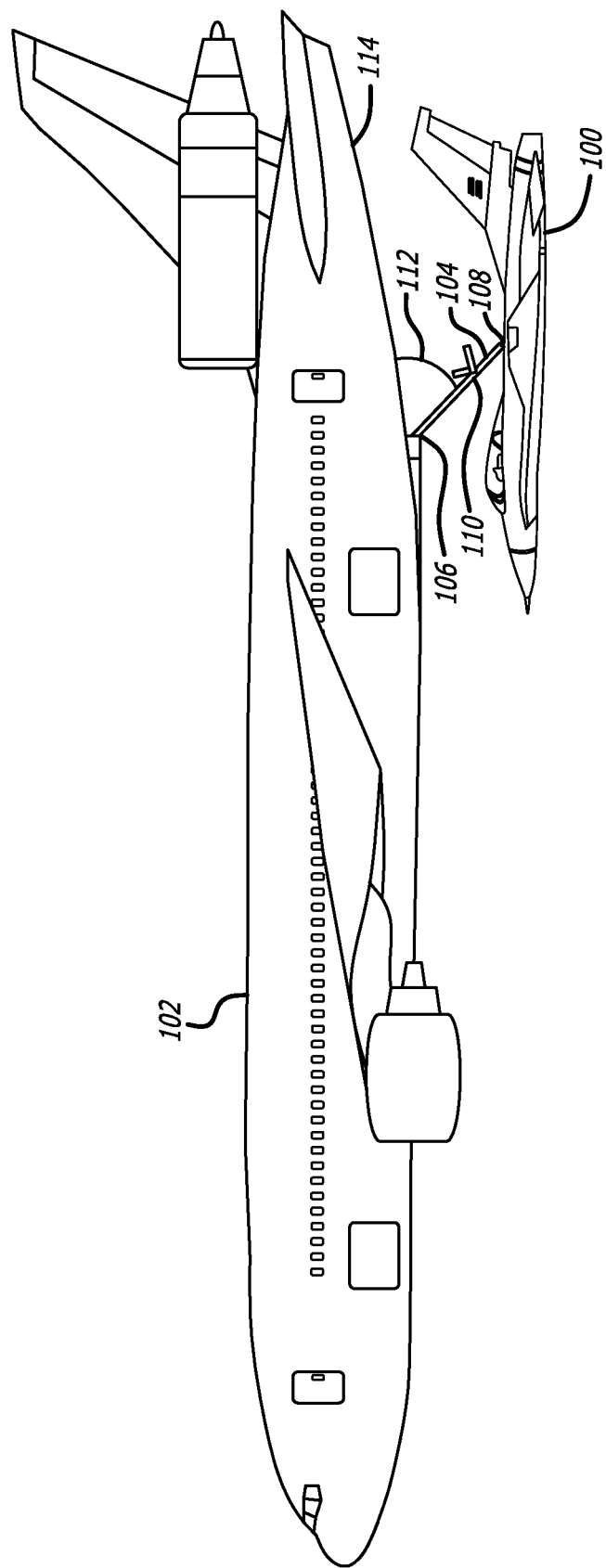
FIG. 1 is diagram of an example of implementation of a known refueling boom transferring fuel from a refueling aircraft and receiving aircraft.

An aerial refueling boom elevation estimation ("ARBEE") system for estimating an elevation angle of an aerial refueling boom on an aerial refueling aircraft is described. The ARBEE system may include a data collector, storage unit, optimizer, and comparator.

In this example, the data collector may be in signal communication with the storage unit, a plurality of inertial measurement units ("IMUs"), a cable length sensor, aerial refueling boom position sensors (that are configured to measure the elevation and roll), and a dynamic pressure sensor. The storage unit may also be in signal communication with the optimizer and the comparator and the optimizer may also be in signal communication with the comparator. The data collector is configured to receive measured data signals from the plurality of IMUs, the cable length sensor, aerial refueling boom position sensors, and the dynamic pressure sensor and send the measured data from the received measured data signals to a first database in the storage unit. The measured data may include measured aerial refueling boom elevation data, measured aerial refueling boom azimuth data, measured dynamic pressure data, and measured hoist cable length data corresponding to a measured aerial refueling boom elevation angle, measured aerial refueling boom azimuth angle, measured dynamic pressure exerted on the aerial refueling boom, and measured hoist cable length of a hoist cable coupled between a hoist on the aerial refueling aircraft and the aerial refueling boom, respectively. The optimizer is configured to receive the measured data from the first database, optimize it, and store it as optimized data in a second database in the storage unit and the optimized data may include optimized aerial refueling boom elevation estimation data that corresponds to a predicted aerial refueling boom elevation angle that was derived from the measured data. The comparator is configured to determine the difference between the optimized aerial refueling boom elevation estimation data and the measured aerial refueling boom elevation data to determine an elevation data error, compare the elevation data error to a predetermined threshold value, and send error information to the optimizer if the elevation data error is greater than the predetermined threshold value. The optimizer is configured to utilize the error information to further optimize the estimation data and store it as updated optimized data in the second database. In this example, the elevation angle of the aerial refueling boom is determined from the optimized data.

In an example of operation, the ARBEE system may perform a method that includes collecting measured data signals from the plurality of IMUs, the cable length sensor, aerial refueling boom position sensors, and the dynamic pressure sensor and generating the first database of measured data corresponding to the collected measured data signals. The ARBEE system then optimizes the measured data of the first database to create the second database of optimized data corresponding to the measured data, wherein the measured data includes measured aerial refueling boom elevation data and wherein the optimized data includes optimized aerial refueling boom elevation estimation data. The ARBEE system then compares the optimized data to the measured data to determine the difference between the optimized aerial refueling boom elevation data and the measured aerial refueling boom elevation data to determine the elevation data error and then determines if the elevation data error is greater than the predetermined threshold value. If the elevation data error is greater than the predetermined threshold value, the ARBEE system then updates the optimized data and utilizes the optimized data to determine the elevation angle of the aerial refueling boom.

In general as an example of an implementation, this method may utilize information provided by the plurality of IMUs and aerial refueling boom position sensors on the aerial refueling boom and by measuring a hoist-cable length extending from a hoist mechanism, on the aerial refueling aircraft, to the aerial refueling boom. Utilizing this information the method may maximize the detection of a single point system failure and minimize any false alarms given by a plurality of linear variable differential transformer ("LVDT") position sensors.

In this example, the LVDT position sensors are both quad-electric and dual-mechanical sensors. The LVDT position sensors measure the refueling boom angles, which include pitch and roll angles and may be described as a "channel A" value and "channel B" value. As such, a "single point" system failure, for example, may include the situation described earlier where a faulty LVDT position sensor (i.e., a "bad" sensor) may have a mechanical shaft failure within the bad sensor, which resulting produces incorrect sensor outputs that will have the same values for both channel A and channel B. As a result, when the bad sensor is compared to a "good" sensor (i.e., a LVDT position sensor that is not faulty), the resulting ratio (i.e., A/B) of the channels of each LVDT position sensor will agree but, unfortunately, it will not be possible to know which LVDT position sensor is correct. In this example, the aerial refueling boom position sensors may be LVDT position sensors.

One method for solving this problem includes utilizing an extended Kalman filter ("EKF") to estimate the elevation angle from the information provided by the IMUs that includes corresponding angular rate and acceleration signals for the control of the refueling boom. This approach propagates the angular rate via a kinematic equation (such as, for example, an Euler or quaternion based equations) so as to obtain corresponding angle estimates. The method also utilizes acceleration (i.e., the gravity vector) as a reference so as to remove biases that are inherent to the angular rate measurement. In general, this method provides a stable/bounded angle estimation for the elevation angle of the refueling boom. However, the realization of the EKF is fairly complicated and computationally expensive. Additionally, it may also add another potential failure point that may require a separate monitor and/or hardware redundancy.

In response, the presently described method is an alternative process that identifies the single point failure and minimizes any false alarms given by the LVDT position sensors and provides an orthogonal approach for estimating the refueling boom elevation angle.

In general, this method utilizes the fact that the hoist-cable tension is maintained constant even though in general the hoist-cable tension is a function of dynamic pressure, aerial refueling boom azimuth, aerial refueling boom elevation, and hoist cable length. This method utilizes this fact because it then generates a table of values such that the aerial boom elevation angle may be "looked up" and determined uniquely. Then during test flights, the method collects flight data regarding the boom to generate a "truth table" in a database which is then quantized a priori for optimization. Then the method utilizes an optimization technique that uses the resulting three-dimensional ("3-D") table in the database and then generates a corresponding optimal solution that minimizes an error function. Utilizing this error function, the method determines if the error between the table of values (i.e., a truth table) and the optimal solution is within a predetermined threshold. The method then builds up an optimized 3-D lookup table of values based on the results. In this example, the predetermined threshold may be determined by the requirements for accuracy. As an example, if an accuracy requirement is that the accuracy of the aerial refueling elevation estimate should be about plus-or-minus 0.5 degrees, then the predetermined threshold may be determined such that the accuracy of the resulting optimal solution meets this accuracy requirement.

In this example, the refueling boom has three independent IMUs with which an integrated signal management ("ISM") provides the corresponding angular rate and acceleration signals for control of the aerial refueling boom. The ISM is generally a system that manages various signals that include the IMUs. Generally, the ISM is implemented in software. An example method for aerial refueling boom elevation angle estimation using the IMU is to formulate an EKF. In this example, the method propagates the angular rate (i.e., integrates the angular measurement over time to get a corresponding angle) via a kinematic equation (for example, a Euler or quaternion based kinematic equation) to obtain the corresponding angle estimates, and uses the acceleration as a reference, i.e., gravity vector, in order to remove biases inherent to the angular rate measurement. This "propagation" and "update/bias removal" method provides generally a stable or bounded angle estimation. It is appreciated by those of ordinary skill in the art that a kinematic equation is an equation that governs the motion (i.e., the rotational and translational motion) of the corresponding mechanical system of the refueling boom.

However, realization of the EKF is fairly complicated and computationally expensive. In addition to that, the reference generated from the acceleration measurement is degraded as the boom (and the aircraft) is under dynamic conditions because the gravity vector becomes skewed because the accelerometer picks up non-gravitational acceleration, and also cannot resolve the yaw ambiguity. In this example, the gravity angle is orthogonal to the yaw plane, thus the method is not able to remove the bias associated with the yaw rate.

An alternative approach to using the IMU is to exploit the fact that the hoist mechanism will maintain a constant tension on the hoist-cable. Given this, it is possible to generate a table such that the aerial refueling boom elevation angle may be accessed (i.e., "looked up") and determined uniquely.

In this approach, the hoist-cable tension ("$T_{cable}$") is a function of the dynamic pressure ("$\bar{q}$") exerted on the aerial refueling boom, the aerial refueling boom azimuth angle ("$\Psi_B$"), aerial refueling boom elevation angle ("$\theta_a$"), and hoist-cable length ("$l_{hoist}$"). Written as an equation, the hoist-cable tension $T_{cable}$ is shown to be:

$$T_{cable} = f(\tilde{q}, \psi_B, \theta_B, l_{hoist}).$$

Therefore, for any given three parameters, the remaining one can be uniquely determined. That is, for given dynamic pressure q̃, aerial refueling boom azimuth angle $\Psi_B$, and hoist-cable length $1_{hoist}$ the total aerial refueling boom elevation angle $\theta_B$, can be uniquely determined. However, in this example, the hoist-cable tension function $f$ is nonlinear, thus finding an analytical solution may be difficult, or at least may not be practical.

Specifically, determining the hoist-cable tension function includes multiples steps that include determining a drag coefficient of the hoist-cable; determining a linear force density and aero-drag vector; determining a linear force density perpendicular to aero-drag vector; determining an aerial refueling boom hoist-cable location and stretches; determining an arc-length of hoist-cable; determining a hoist-cable spring constant; and determining a hoist-cable tension and forces.

Figure 2:
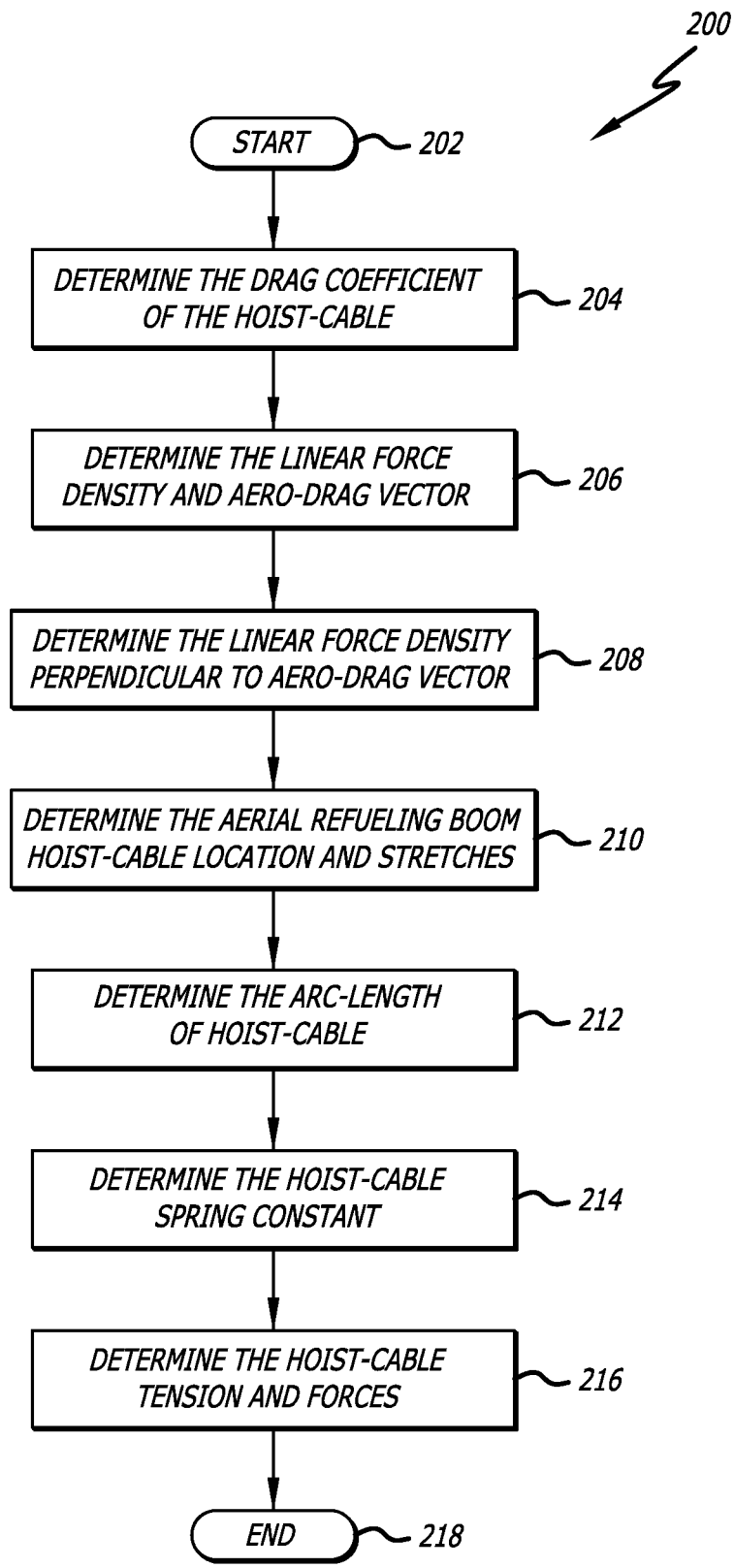
FIG. 2 is a flowchart of an example of an implementation of a process configured to find an analytical solution for hoist-cable tension function $f$ in accordance with the present invention.

For example, in FIG. 2 a flowchart 200 of an example of an implementation of a process configured to find a numerical solution for hoist-cable tension function $f$ is shown in accordance with the present invention. The method may start 202 by first determining a drag coefficient for a hoist-cable connected between the aerial refueling boom and the aerial refueling aircraft 204 and then determining a linear force density and aero-drag vector for the hoist-cable 206. The method then determines a linear force density perpendicular to the aero-drag vector 208 and determines an aerial refueling boom hoist-cable location and hoist-cable stretchers 210. Moreover, the method determines an arc-length of the hoist-cable 212, determines a hoist-cable spring constant 214, and determines a hoist-cable tension 216 from the drag coefficient for the hoist-cable, linear force density and aero-drag vector for the hoist-cable, linear force density perpendicular to the aero-drag vector, aerial refueling boom hoist-cable location, hoist-cable stretchers, arc-length of the hoist-cable, and hoist-cable spring constant. The process then ends 218.

Instead of finding a numerical solution for the hoist-cable function $f$, an alternative approach includes an optimization method that may be utilized to produce an estimate for the aerial refueling boom elevation angle $\theta_B$ values and then minimizes the error of those values by utilizing the fact that hoist-cable function $f$ is equal to the constant hoist-cable tension $T_{cable}$. In this method, the optimization is performed by defining the following error function relationship:

$$e(\theta_B) = f(\tilde{q}, \psi_B, \theta_B, l_{hoist}) - T$$

$$\min |e(\theta_B)|$$

subject to $\theta_B \in R$.

Figure 3:
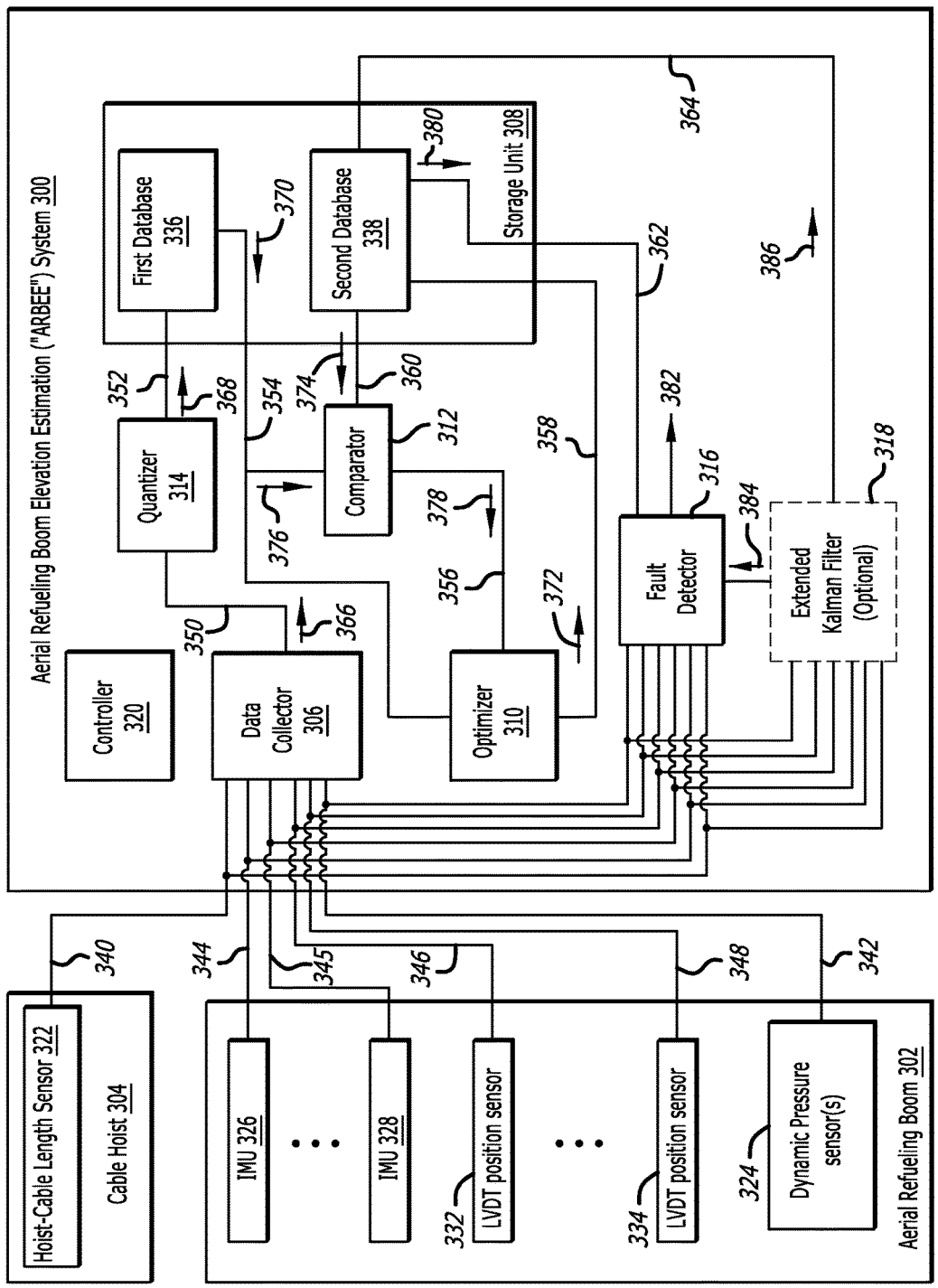
FIG. 3 is a system block diagram of an example of an aerial refueling boom elevation estimation ("ARBEE") system in accordance with the present invention.

Turning to FIG. 3, a system block diagram of an example of an implementation of an ARBEE system 300 is shown in accordance with the present invention. The ARBEE system 300 is configured to perform the optimization process described above.

In this example, the ARBEE system 300 is located within an aerial refueling aircraft (not shown). The ARBEE system 300 is shown in signal communication with an aerial refueling boom 302 and a cable hoist 304 on the refueling aircraft. The ARBEE system 300 may include a data collector 306, storage unit 308, optimizer 310, and comparator 312. The ARBEE system 300 may also include a quantizer 314, fault detector 316, optional EKF 318, and controller 320. In this example, the cable hoist 304 may include a hoist-cable (not show) that is attached, connected, and/or coupled between the cable hoist 304 and the aerial refueling boom 302. The cable hoist 304 may include hoist-cable length sensor 322. The aerial refueling boom 302 may include a dynamic pressure sensor (or sensors) 324 and a plurality of IMUs 326 and 328, of which only two are shown for illustration though it is appreciated by those skilled in the art that additional IMUs may also be utilized. The aerial refueling boom 302 may also include a plurality of aerial boom position sensors that are shown as LVDT position sensors 330 and 332, of which only two are shown for illustration though it is again appreciated that additional LVDT position sensors may also be utilized. Moreover, the storage unit 308 may include a first database 336 and a second database 338.

In this example, the data collector 306, fault detector 316, and optional EKF 318 may be each in signal communication with, hoist-cable length sensor 322, dynamic pressure sensor (s) 324, IMUs 326 and 328, and LVDT position sensors 332 and 334 via signal paths 340, 342, 344, 345, 346, and 348, respectively. The quantizer 314 may be in signal communication with the data collector 306 and first database 336 of the storage unit 308 via signal paths 350 and 352, respectively. The first database 336 may also be in signal communication with the optimizer 310 and comparator 312 via signal path 354. The optimizer 310 may be in signal communication with the comparator 312 and second database 338 in the storage unit 308 via signal paths 356 and 358, respectively. Moreover, the second database 338 may be in signal communication with the comparator 312, fault detector 316, and EKF 318 via signal paths 360, 362, and 364, respectively. In this example, the controller 320 may be in signal communication with the data collector 306, storage unit 308, optimizer 310, comparator 312, quantizer 314, fault detector 316 and EKF 318 via signal paths (not shown) that may include, for example, a computer bus structure.

It is appreciated by those skilled in the art that the circuits, components, modules, and/or devices of, or associated with, the ARBEE system are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

Turning to the components shown in FIG. 3, the data collector 306 may be a circuit, component, module, and/or device capable of receiving measured data signals from hoist-cable length sensor 322, dynamic pressure sensor (or sensors) 324, IMUs 326 and 328, and LVDT position sensors, 332 and 334. In this example, the measured data signals are sensor signals that may be analog, digital, or both, in nature. The measured data signals from the dynamic pressure sensor(s) 326 and LVDT position sensors, 332 and 334 are sensor signals that provide information about the dynamic pressure q̃ exerted on the aerial refueling boom 302, the aerial refueling boom azimuth angle $\Psi_B$, and the aerial refueling boom elevation angle $\theta_B$. It is appreciated by those skilled in the art that $\Psi_B$ is also known as the "yaw" of the aerial refueling boom and $\theta_B$ is also known as the "pitch" of the aerial refueling boom. It is also appreciated that the aerodynamic stress experienced on the aerial refueling boom 302 as it travels through the air is proportional to the dynamic pressure q̃.

In this example, each LVDT position sensor 332 and 334 is a sensor capable of providing both linear position and displacement measurements of certain aspects of the aerial refueling boom 302.

The data collector 306 may also receive additional measured data signals from and the hoist-cable length sensor 322 on the cable hoist 304. The cable hoist 304 is typically an electromechanical device located towards the rear of the aerial refueling aircraft that is connected to a hoist-cable that is also connected to the aerial refueling boom 302. The aerial refueling boom 302 is lowered and raised from the aerial refueling aircraft by a flight control stick ("FSC") that moves control surfaces (i.e., elevator and rudders) on the aerial refueling boom, and the cable hoist 304, which extends and contracts the length of the hoist-cable attached to the aerial refueling boom 302 in order to maintain cable tension constant. The hoist-cable length sensor 322 is a sensor that is capable of measuring the length of the hoist-cable as it extends from the cable hoist 304 to the aerial refueling boom 302.

The data collector 306 is configured to receive, collect, or both, all of these measured data signals and produce measured data 366 information that may be passed to the first database 336 in the storage unit 308. The measured data 366 may be quantized by a quantizer 314 prior to passing the measured data 366 to the first database 336.

The quantizer 314 may be a circuit, component, module, and/or device capable of receiving the measured data 366 from the data collector 306 and quantizes the measured data 366 into a new measured data 368. In this example, the measured data 366 is generally a smooth data signal and the new measured data 368 may be a stair-step type of data signal or digitally sampled signal. Once quantized, the measured data 368 is stored in the first database 336.

In this example, the storage unit 308 may be a machine memory unit such as a computer data storage device utilized to store information such as, for example, a random access memory ("RAM") and non-volatile memory such as, for example, a hard disk drive ("HDD"), flash drive, etc. In this example, the storage unit 308 is shown to include at least two databases 336 and 338. It is appreciated that both the first and second databases 336 and 338 may be memory sections of the storage unit 308 that are configured to accept an organized collection of data where the organized collection of data is generally organized in a fashion that assists in the operation of the ARBEE system 300. Specifically, the first database 336 may be organized in way where the measured data 368 is stored in a fashion that is generally a multi-dimensional table of measured values corresponding to the measured data 368. As an example, the first database 336 may be a four-dimension database corresponding to the four variables of values in the measured data 368 such that a first-dimension corresponds to a range of the measured dynamic pressure data q̃, the second-dimension corresponds to a range of the measured hoist-cable length data $l_{cable}$, the third-dimension corresponds to a range of the measured aerial refueling boom azimuth data $\Psi_B$, and the fourth-dimension corresponds to a range of the measured aerial refueling boom elevation data $\theta_B$. In this example, the hoist-cable tension ("$T_{cable}$") is assumed to be constant. Alternatively, the first database 336 may be organized as a plurality of 3-D tables of measured values corresponding to different values of the measured dynamic pressure data q̃. In this example, the multi-dimension table may be referred to generally as lookup tables. In this example, the first database 336 and second database 338 are shown as being part of the same storage unit 308; however, it is appreciated by those of ordinary skill in the art that the first database 336 and second database 338 may be alternatively located within separate storage units (not shown).

The optimizer 310 may be a component, module, and/or device capable of retrieving first database data 370 from the first database 336 and optimizing the first database data 370 utilizing an optimization sub-process and then sending the optimized data 372 to the second database 338. The optimizer 310 may utilize the sub-process described in FIG. 2; however, it may also utilize another less computationally intensive process. The optimizer 310 may be configured to operate in combination with the comparator 312, where the comparator 312 may be a circuit, component, module, and/or device capable of determining whether an aerial refueling boom elevation data error (referred to simply as an "elevation data error") is less than a predetermined threshold value as described earlier. Again as stated earlier, the predetermined threshold value may be determined by the requirements for accuracy of the ARBEE system 200. For an example, if an accuracy requirement is that the accuracy of the aerial refueling elevation angle estimate ("$\theta_{Bestimate}$") should be about plus-or-minus 0.5 degrees, then the predetermined threshold value may be determined such that the accuracy of the resulting optimal solution meets this accuracy requirement. In this example, the optimizer 310 and comparator 312 are show as different components; however, it is appreciated by those or ordinary skill that they may be combined into one component.

In this example, the comparator 312 is configured to compare the optimized aerial refueling boom elevation data 374 (also referred to as the aerial refueling elevation angle estimate $\theta_{Bestimate}$), of the optimized data 372 stored in the second database 338, and the measured aerial refueling boom elevation data $\theta_B$ 376, of the measured data 370 stored in the first database 336, to determine an elevation data error and compare the resulting elevation data error to the predetermined threshold value. The elevation data error may be equal to the absolute value of the difference between the optimized aerial refueling boom elevation data $\theta_{Bestimate}$ 374 and the measured aerial refueling boom elevation data $\theta_B$ 376. If the elevation data error is greater than the predetermined threshold value, the comparator 312 sends update information 378 to the optimizer 310. The optimizer 310 utilizes the update information 378 to update the optimized data 372 which is stored in the second database 338. If the elevation data error is less than or equal to the predetermined threshold value, the comparator 312 compares the next pair of values of the optimized aerial refueling boom elevation data $\theta_{Bestimate}$ 374 of the second database 338 and the measured aerial refueling boom elevation data $\theta_B$ 376 of the first database 336 until all the optimized aerial refueling boom elevation data $\theta_{Bestimate}$ 374 and measured aerial refueling boom elevation data $\theta_B$ 376 has been processed.

In this example, this optimization process is performed on measured data received by the ARBEE system 300 while preforming actual test flights of the aerial refueling aircraft and aerial refueling boom. These test flights may be performed prior to any optimization in order to fully load the measured data 368 into the first database 336. The optimization process may then be performed on all the measured data 368 to generate a complete set of optimized data 372 values that are stored in the second database 338 for use as a lookup table when the aerial refueling boom 302 is in operation.

Similar to the first database 336, the second database 338 may be organized in way where the optimized data 372 is stored in a fashion that is generally a multi-dimensional table of measured values corresponding to the optimized data 372.

As an example, the second database 338 may be a four-dimension database corresponding to the four variables of values in the optimized data 372 such that a first-dimension corresponds to a range of the measured dynamic pressure data q̃, the second-dimension corresponds to a range of the measured hoist-cable length data $l_{cable}$, the third-dimension corresponds to a range of the measured aerial refueling boom azimuth data $\Psi_B$, and the fourth-dimension corresponds to a range of the optimized aerial refueling boom elevation data $\theta_{Bestimate}$. As described earlier, in this example, the hoist-cable tension $T_{cable}$ is assumed to be constant. Alternatively, the first database 336 may be organized as a plurality of 3-D tables of measured values corresponding to different values of the measured dynamic pressure data q̃.

The process (or processes) performed by the ARBEE system 300 may be controlled by the controller 320. The controller 320 may be programmable device that may be hardwired, software controlled, or both. In the case of a software controlled device, the storage unit 308 may optionally be utilized to store software and executable codes capable of running the controller 320. Examples of the controller 320 may include a microcontroller, processor, microprocessor, digital signal processor ("DSP"), programmable gate array ("PGA"), application specific integrated chip ("ASIC"), standalone computer system, or combination thereof. While not show in FIG. 3, it is appreciated that the controller 320 may be in signal communication with all the components in the ARBEE system 300 via a computer bus type signal path.

Turning to the fault detector 316, the fault detector 316 may be a circuit, component, module, and/or device capable of detecting a single point system failure. Specifically, the fault detector 316 is configured to receive the measured data signals 346, 348, and 342 and compares those values to the optimized data values 380 from the second database 338. If the comparison is greater than a second predetermined threshold, a fault is detected and the fault detector 316 produces a fault signal 382 that may be utilized by the ARBEE system 300 to identify a single fault condition. Once a fault condition is identified by the fault detector 316, the ARBEE system 300 may switch to a mode of operation that only utilizes the information (i.e., the optimized aerial refueling boom elevation data $\theta_{Bestimate}$) from the second database 338 to determine the aerial refueling boom elevation angle since one or more sensors on the aerial refueling boom 302 has failed. In general, the fault detector 316 utilizes a majority voting scheme in order to determine a fault signal from the LVDT sensors 332 and 334 where the majority is assumed to be correct especially if the fault detector 316 receives independent signals from the LVDT sensors 332 and 334, an EKF estimate (optional), and an estimate from second database 338 where all the values are compared against each other using the majority voting scheme.

As an additional example, the ARBEE system 300 may include an optional EKF 318 for estimating the aerial refueling boom elevation angle ("$\theta_{B-EKF}$") 384 that is also feed into the fault detector 316. The EKF 318 may also produce a roll estimation ("$\varphi_{EKF}$") that may also be feed into the fault detector 316. In this example, both the aerial refueling boom elevation angle $\theta_{B-EKF}$ 384 and roll estimation $\varphi_{EKF}$ may be compared, in the fault detector 316, against the measured aerial refueling boom elevation angle and roll to determine is a fault has occurred. Additionally, in this example, the aerial refueling boom azimuth ("$\Psi_{B-EKF}$") 386 may be feed into the second database 338 since, in general, the measured aerial refueling boom azimuth is not an independent measurement because it is a function of the aerial refueling boom elevation and roll (i.e., yaw) angles.

Figure 4:
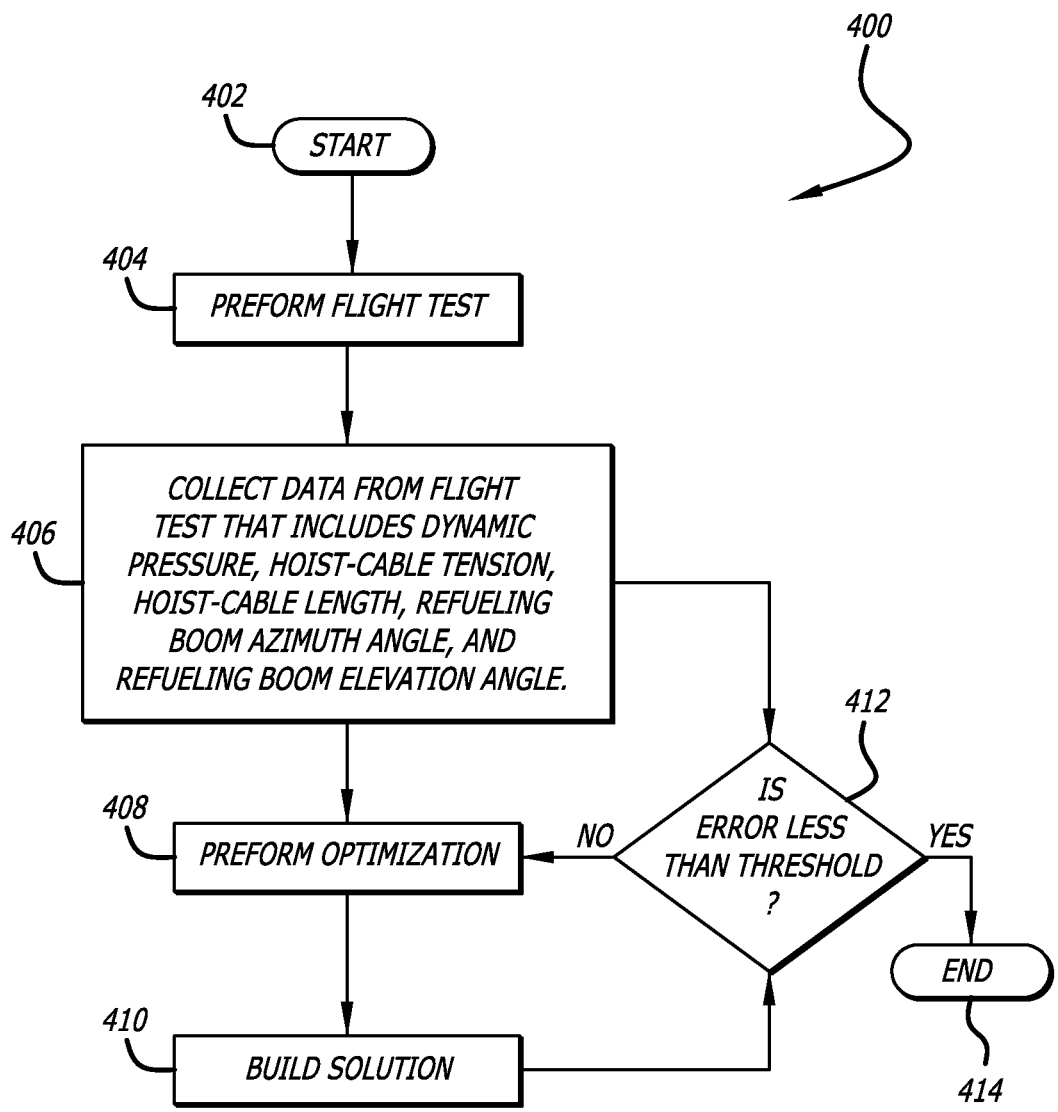
FIG. 4 is a flowchart of an example of an implementation of optimizing process performed by the ARBEE system of FIG. 3 in accordance with the present invention.
Figure 5A:
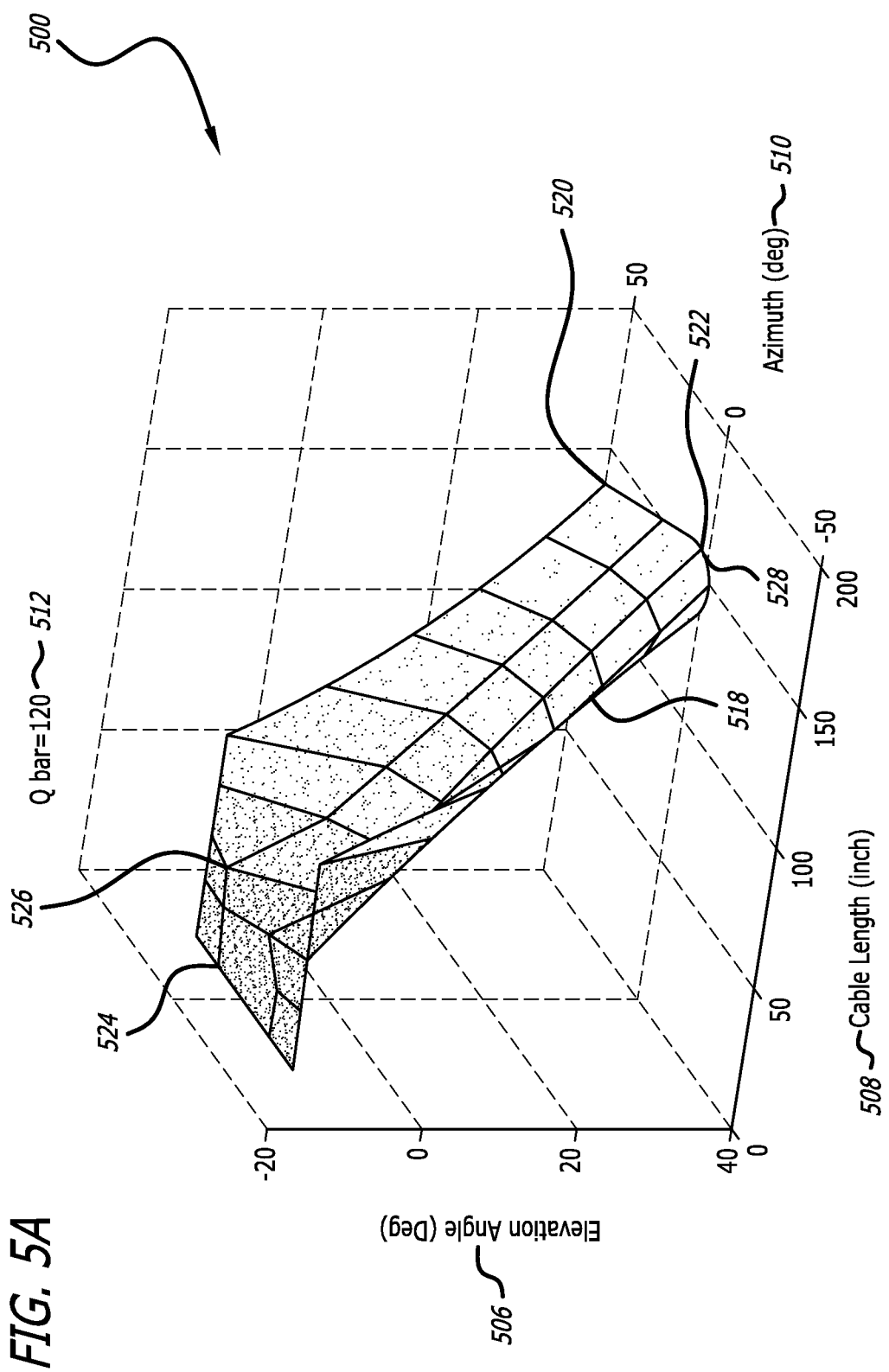
FIG. 5A is a three-dimensional ("3-D") graphical plot of an example of an implementation of the optimized data values of the second database, of FIG. 3, in aerial refueling boom elevation angle versus hoist-cable length and aerial refueling azimuth angle for a first flight condition having a first dynamic pressure value in accordance with the present invention.
Figure 5B:
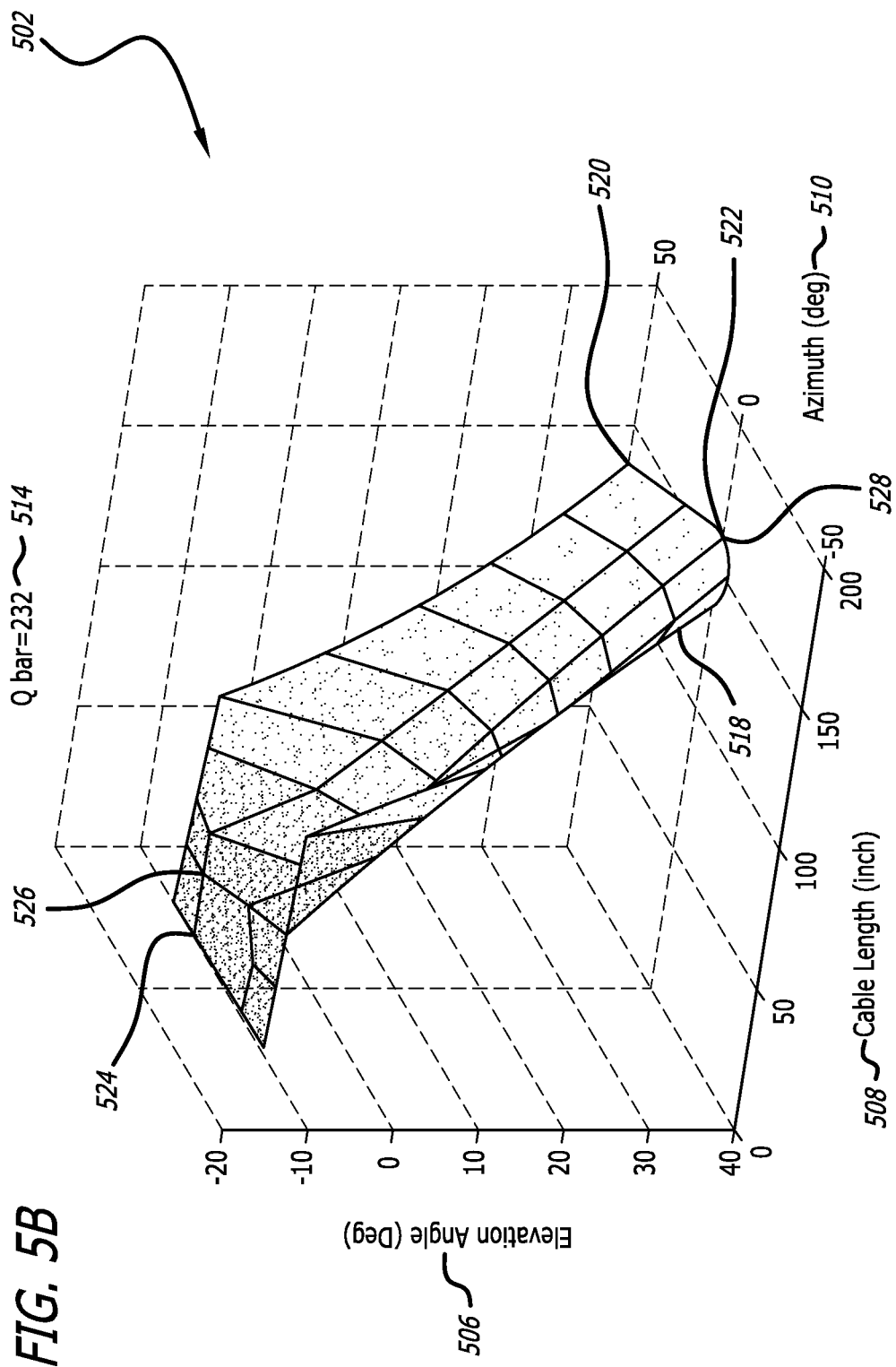
FIG. 5B is a 3-D graphical plot of an example of an implementation of the optimized data values of the second database, of FIG. 3, in aerial refueling boom elevation angle versus hoist-cable length and aerial refueling azimuth angle for a second flight condition having a second dynamic pressure value in accordance with the present invention.
Figure 5C:
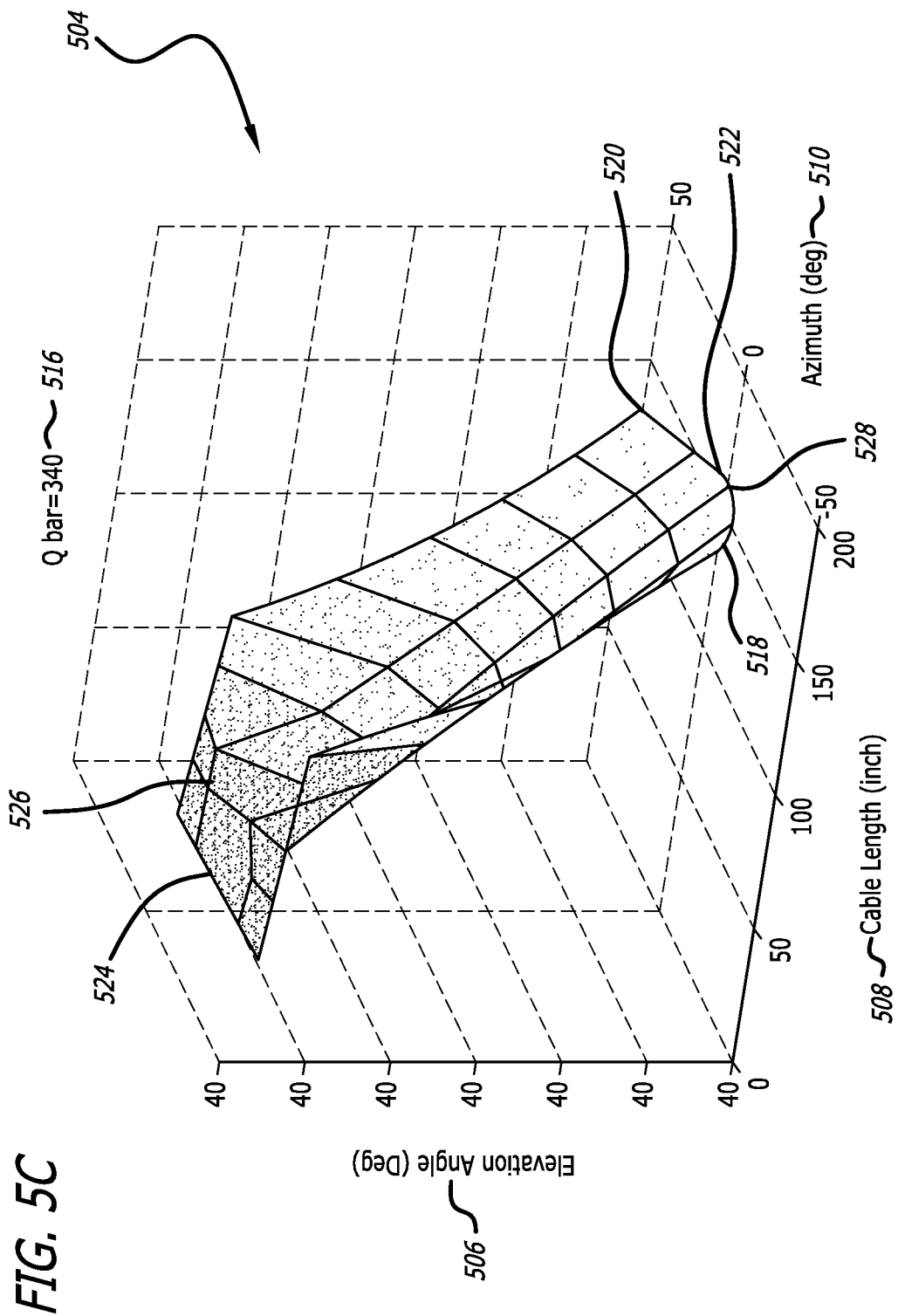
FIG. 5C is a 3-D graphical plot of an example of an implementation of the optimized data values of the second database, of FIG. 3, in aerial refueling boom elevation angle versus hoist-cable length and aerial refueling azimuth angle for a third flight condition having a third dynamic pressure value in accordance with the present invention.

Turning to FIG. 4, a flowchart 400 of an example of an implementation of optimizing process performed by the ARBEE system 300 (of FIG. 3) is shown in accordance with the present invention. The process starts 402 by first preforming flight tests 404 that produce the measured data necessary to fill in the values of the first database 336. The data collector 306 then collects 406 measured data from the flight test that includes dynamic pressure, hoist-cable length, aerial refueling boom azimuth angle, and refueling boom elevation angle data. The optimizer 310 then optimizes 408 the measured data and builds a solution 410 in the second database 338 of optimized data 372. The comparator 312 then compares the optimized aerial refueling boom elevation data 374, $\theta_{Bestimate}$ and the measured aerial refueling boom elevation data $\theta_B$ 376 (stored in the first database data 336) to determine the elevation data error and compare the resulting elevation data error to the predetermined threshold value 412. If the elevation data error is greater than the predetermined threshold value, the process returns to optimization step 408 and repeats. If, alternatively, the elevation data error is less than or equal to the predetermined threshold value, the process ends 414.

In FIGS. 5A, 5B, and 5C, 3-D graphical plots 500, 502, and 504 of an example of an implementation of the optimized data values of the second database 338, of FIG. 3, in aerial refueling boom elevation angle 506 (in degrees) versus hoist-cable length data 508 (in inches) and aerial refueling azimuth angle 510 (in degrees) for three fight conditions having varying dynamic pressure values 512, 514, and 516 in accordance with the present invention. In this example, the dynamic pressure values are 120 Qbar (i.e, pounds per square foot) 512 for FIG. 5A, 232 Qbar 514 for FIG. 5B, and 340 Qbar 516 for FIG. 5C. In this example, the aerial refueling boom azimuth (i.e., yaw) angles may be equal to −25 degrees 518, 25 degrees 520, and 5 degrees 522, while the hoist-cable length may be equal to 0 inches 524, 160 inches 526, or 10 inches 528.

However, as stated earlier, aerial refueling boom azimuth angle is not an independent measurement, but is computed using both elevation and roll angles, i.e., the aerial refueling boom elevation estimate depends on its own prior (past) estimate, and the aerial refueling boom roll angle. Although the aerial refueling boom roll angle is an independent measurement, this additional measurement need may cause a cross-coupling degradation and failure potentially if the aerial refueling boom roll angle is not available and/or degraded. However, this implication is minimized when the aerial refueling boom roll angle measurement is not a necessary, but an enough condition, meaning that the resulting accuracy degradation due to a lack of the aerial refueling boom azimuth angle measurement is tolerable for detecting an elevation failure in the aerial refueling boom, not providing an estimate to use in absence of an elevation sensor.

Figure 6:
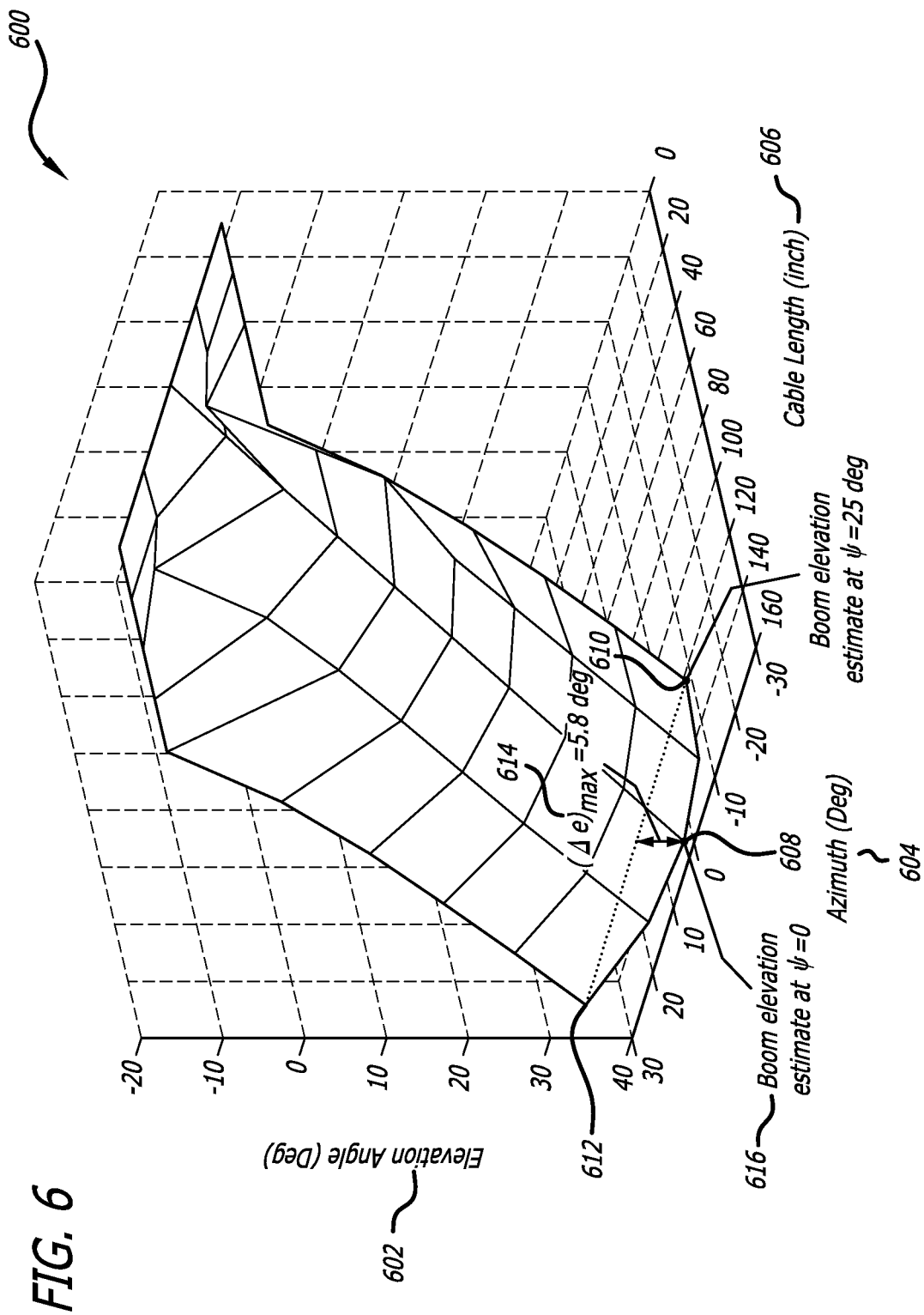
FIG. 6 is a 3-D graphical plot of an example of an implementation of the worst-case scenario of the aerial refueling boom elevation angle versus aerial refueling boom azimuth and hoist-cable length 606 in accordance with the present invention.

Turning to FIG. 6, a 3-D graphical plot 600 of an example of an implementation of the worst-case scenario of the aerial refueling boom elevation angle 602 (in degrees) versus aerial refueling boom azimuth angle 604 (in degrees) and hoist-cable length 606 (in inches) is shown in accordance with the present invention. In this example, the hoist-cable length is shown fully extended 608 at about 160 inches. The aerial refueling boom azimuth angle 604 varies from −25 degrees 610 to 25 degrees 612. This 3-D graphical plot 600 is generally an overlap of the 3-D graphical plots 500, 502, and 504 of FIGS. 5A, 5B, and 5C and represents the worst-case elevation error ("Δe," "Δθ$_B$," or e(θ$_B$) as described earlier) of the aerial refueling boom elevation angle estimate when the aerial refueling boom azimuth angle is not utilized. Specifically, this 3-D graphical plot 600 shows the maximum elevation error ("Δe$_{max}$") 614 when the aerial refueling boom is restricted to moving up and down along a center line 616 where the aerial refueling boom azimuth angle Ψ$_B$ value is equal to zero. In this example, the maximum elevation error Δe$_{max}$ 614 is shown to be equal to approximately 5.8 degrees and it is appreciated that even if the aerial refueling boom azimuth angle Ψ$_B$ value varies from −25 degrees to 25 degrees, the resulting elevation error Δe is less and or equal to the maximum elevation error Δe$_{max}$ 614. For this example, it is appreciated that when the hoist-cable length is unwound to its maximum length, the corresponding elevation error Δe is maximum.

Figure 7:
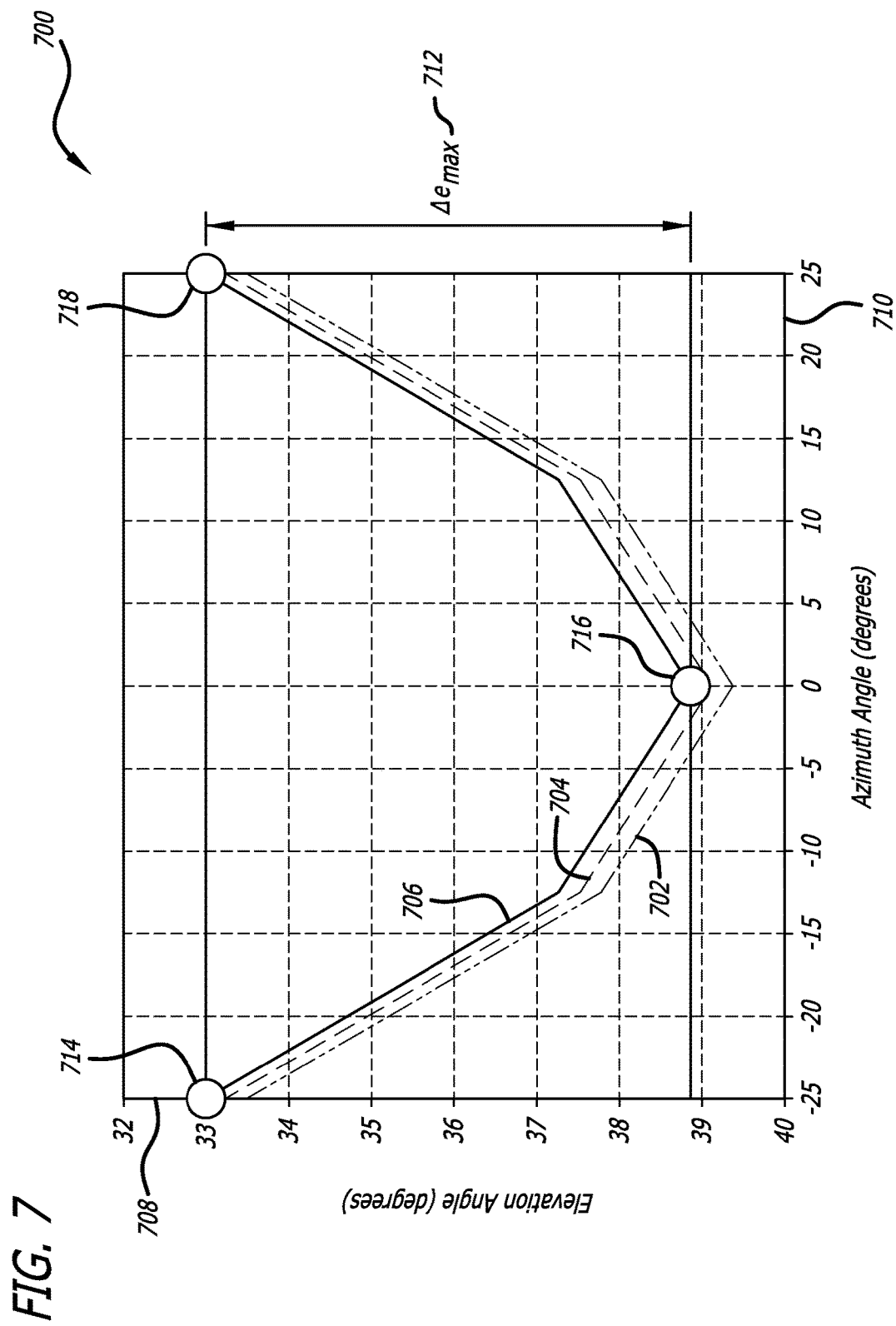
FIG. 7 is a two-dimension ("2-D") graph of three plots of an example of an implementation of the worst-case scenario of the aerial refueling boom elevation angle versus aerial refueling boom azimuth angle for different dynamic pressure values in accordance with the present invention.

In FIG. 7, a two-dimension ("2-D") graph 700 of three plots 702, 704, and 706 of an example of an implementation of the worst-case scenario of the aerial refueling boom elevation angle 708 (in degrees) versus aerial refueling boom azimuth angle 710 (in degrees) for different dynamic pressure values is shown in accordance with the present invention. The different dynamic pressure values may be equal 120 Qbar for plot 702, 232 Qbar for plot 704, and 340 Qbar for plot 706. In this example, the 3-D graphical plot 600 of FIG. 6 is collapsed into a 2-D graphical plots 702, 704, and 706 by assuming that the hoist-cable length is at the maximum length of the hoist-cable. Again, from these plots 702, 704, and 706 it appreciated that a maximum elevation error Δe$_{max}$ 712 may be determined from the 2-D plotted data. Specifically, in the aerial refueling boom positions may vary between a first position 714 at approximately 33 degrees of elevation angle and −25 degrees of azimuth angle, a second position 716 at approximately 38.8 degrees of elevation angle and 0 degrees of azimuth angle, and a third position 718 at approximately 33 degrees of elevation angle and 25 degrees of azimuth angle. From this example, the worst-case maximum elevation error Δe$_{max}$ 712 may be approximately 5.8 degrees.

From these results, it is appreciated that the aerial refueling boom azimuth angle Ψ$_B$ values may be ignored and assumed to be equal to zero. Using this assumption, the optimized aerial refueling boom elevation data θ$_{Bestimate}$ may be obtained as a function of the hoist-cable length. Turing back to FIGS. 5A, 5B, and 5C, if the 3-D plots 500, 502, and 504 analyzed when the aerial refueling boom azimuth angle Ψ$_B$ values is equal to zero, the plots 500, 502, and 504 flatten out to three 2-D plots of optimized aerial refueling boom elevation data θ$_{Bestimate}$ versus hoist-cable length for three different dynamic pressures of 120 Qbar, 232 Qbar, and 340 Qbar.

Figure 8:
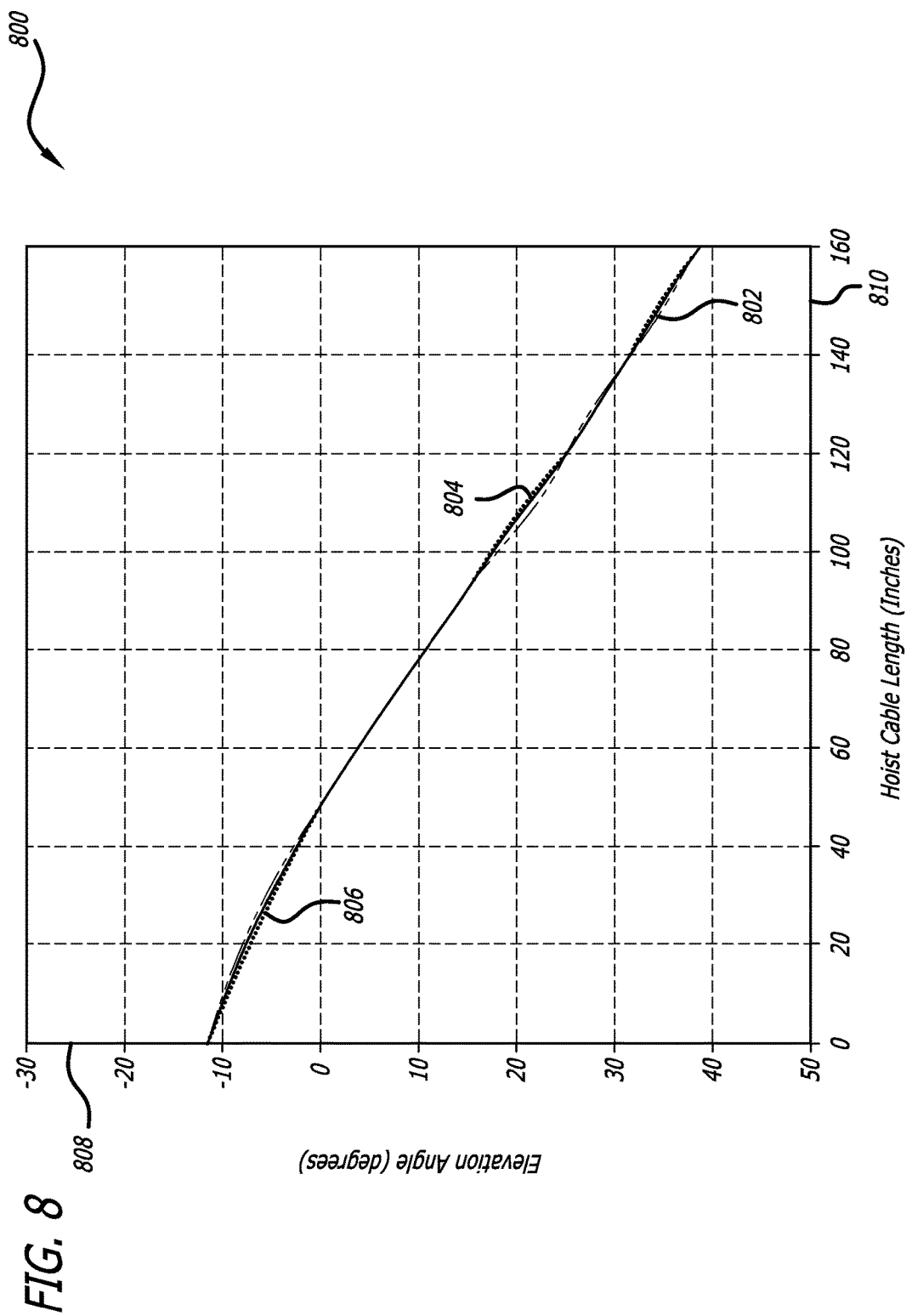
FIG. 8 is a 2-D graph of three plots of an example of an implementation of the worst-case scenario of the aerial refueling boom elevation angle versus the hoist-cable length for different dynamic pressure values in accordance with the present invention.

Turning to FIG. 8, a 2-D graph 800 of three plots 802, 804, and 806 of an example of an implementation of the worst-case scenario of the aerial refueling boom elevation angle 808 (in degrees) versus the hoist-cable length (in inches) 810 for different dynamic pressure values 812, 814, and 816 is shown in accordance with the present invention. In this example, the three dynamic pressures are 120 Qbar for plot 802, 232 Qbar for plot 804, and 340 Qbar for plot 806. From these three plots 802, 804, and 806 it is appreciated that the dynamic pressure values have little impact on the aerial refueling boom elevation angle estimate. As such, the 2-D plots 802, 804, and 806 may be collapsed further utilizing a polynomial fit of the data to produce a relationship where the aerial refueling boom elevation angle estimate θ$_{Bestimate}$ is a linear function of the hoist-cable length l$_{hoist}$ as follows:

$$\theta_{Bestimate} = x l_{hoist} + y$$

where "x" and "y" are first and second predetermined constant coefficients determined by the polynomial fit as shown in FIG. 8.

Utilizing this approach the information in the second database 338 may be simplified to a lookup table of one variable that is the hoist-cable length l$_{hoist}$. Additionally, the optional EKF 318 may also be simplified using this approach because the aerial refueling boom elevation angle may be treated as an independent measurement that decouples the measurement of the aerial refueling boom elevation angle from the roll estimation. In this approach the optional EKF 318 may be constructed as a complementary filter.

Utilizing this approach, once decomposing the aerial refueling boom pitch angle into the aerial refueling boom elevation (θ$_B$) and the aerial refueling boom roll tilt angle (θ$_l$), using directional cosine matrix (DCM), the gravity component at y-axis is given by $$g_y = \sin \varphi \cos \theta_l,$$

where g$_y$ comes from the IMU. Therefore, the roll position angle based on the gravity measurement may be determined as $$\varphi_{grav} = \sin^{-1}\left(\frac{g_y}{\cos\theta_l}\right).$$

Also, from the orthogonal matrices for aerial refueling boom rotating along the aerial refueling boom pivot axes, the roll position rate is given by $$\dot\varphi = \cos\theta_B \cdot p + \sin\theta_B \cdot r$$

where "p" and "r" are the roll and yaw rates respectively. The corresponding roll angle may be determined by integrating the above equation as well.

The roll gravity angle is generally accurate when the aerial refueling boom is in steady state, but its accuracy may suffer when the aerial refueling boom is under dynamic condition, i.e., the gravity component picking up non-gravitational acceleration. However, the roll angle obtained from integrating the roll position rate is generally immune to dynamic conditions and accurate over a short period of time, but its accuracy is typically degraded as time goes due to a built-in bias. Therefore, the next step is to couple these two methods so as to maximize the benefit of each method. There are many techniques and methods on how to implement it. As mentioned earlier, a relatively simple way is to construct a complementary filter.

As an example, a proposed complementary filter may be constructed as $$p_m = p + b_p$$

$$r_m = r + b_r$$

$$\dot{\varphi} = \cos\theta_B \cdot p + \sin\theta_B \cdot r + (\cos\theta_B \cdot b_p + \sin\theta_B \cdot b_r) = \cos\theta_B \cdot p + \sin\theta_B \cdot r + \dot{\varphi}_b$$

$$\varphi_{est_{k+1}} = \varphi_{est_k} + (\dot{\varphi} + \dot{\hat{\varphi}}) \cdot \Delta t$$

$$\dot{\hat{\varphi}} = K_p \cdot (\varphi_{grav} - \varphi_{est_k})$$

where the bias, $\dot{\varphi}_b$, is a scaled error between the gravity angle ($\varphi_{grav}$) and the complementary angle ($\varphi_{est_k}$), which is corrected by the bias estimate. The bias estimate, $\dot{\hat{\varphi}}_b$, is a pseudo bias capturing whatever in p and r measurements, which is fine because there is no need to capture individual biases to improve the accuracy of other axes (i.e., pitch and yaw axes). In this example, the gain term, $K_p$, may be determined by a user, and dictates the contribution between gravity angle and roll rate integration—i.e., a large $K_p$ means that the complementary filter heavily relies on the gravity angle measurement and vice versa.

In these examples, it will be understood and appreciated that one or more of the processes, sub-processes, process steps or approaches described in connection with a ARBEE system may be performed or controlled by hardware, software, or a combination of hardware and software on one or more electronic or digitally-controlled devices. The software may reside in an application memory in a suitable electronic processing component or system such as, for example, one or more of the functional systems, devices, components, modules, or sub-modules. The application memory may include an ordered listing of executable instructions for implementing logical functions (that is, "logic" that may be implemented in digital form such as digital circuitry or source code or in analog form such as an analog source such as an analog electrical, sound, or video signal). The instructions may be executed within a processing module, which includes, for example, one or more microprocessors, general purpose processors, combinations of processors, digital signal processors ("DSPs"), field programmable gate arrays ("FPGAs"), or application-specific integrated circuits ("ASICs"). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units. It is also understood that term database is used to include traditional databases and relational database, flat files, data structures. Examples of some databases include SQL, MySQL, Microsoft® Access to give but a few examples.

The executable instructions may be implemented as a computer program product having instructions stored there in which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read-only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A method of estimating an elevation angle of an aerial refueling boom on an aerial refueling aircraft, the method comprising:
   collecting measured data signals from a hoist-cable length sensor, a plurality of aerial refueling boom position sensors, and a dynamic pressure sensor;
   generating a first database of measured data corresponding to the collected measured data signals;
   optimizing the measured data of the first database to create a second database of optimized data corresponding to the measured data, wherein the measured data includes measured aerial refueling boom elevation data and wherein the optimized data includes optimized aerial refueling boom elevation estimation data;
   comparing the optimized data to the measured data to determine a difference between the optimized aerial refueling boom elevation data and the measured aerial refueling boom elevation data to determine an elevation data error;
   determining if the elevation data error is greater than a predetermined threshold value;
   updating the optimized data if the elevation data error is greater than the predetermined threshold value; and
   utilizing the optimized data to determine the elevation angle of the aerial refueling boom.

2. The method of claim 1, wherein the measured data further includes measured hoist-cable length data, measured dynamic pressure data, and measured aerial refueling boom azimuth data.

3. The method of claim 2, further including quantizing the measured data prior to saving the measured data to the first database.

4. The method of claim 3, wherein generating a first database includes generating a four-dimensional first database wherein the first-dimension is a range of the measured dynamic pressure data, the second-dimension is a range of the measured hoist-cable length data, the third-dimension is a range of the measured aerial refueling boom azimuth data, and the fourth-dimension is a range of the measured aerial refueling boom elevation data.

5. The method of claim 4, wherein creating a second database of optimized data includes removing the measured aerial refueling boom azimuth data to create a three-dimensional second database where the first-dimension is the range of the measured dynamic pressure data, the second-dimension is a range of the cable length data, and the third-dimension is a range of the optimized aerial refueling boom elevation estimation data.

6. The method of claim 5, wherein the second database is a lookup table which is configured to provide an estimate of the aerial refueling boom elevation angle.

7. The method of claim 6, further including determining a fault has occurred in the plurality of aerial refueling boom position sensors.

8. The method of claim 7, wherein the fault is determined by a fault detector in signal communication with the storage unit, the plurality of aerial refueling boom position sensors, the hoist-cable length sensor, and the dynamic pressure sensor.

9. The method of claim 8, wherein each aerial refueling boom position sensor of the plurality of aerial refueling boom position sensors is a linear variable differential transformer ("LVDT") position sensor.

10. The method of claim 8, wherein determining a fault further includes generating a second estimate of the aerial refueling boom elevation angle with an extended Kalman filter ("EKF") that is configured to receive the measured data and the optimized data, wherein the fault detector receives both the optimized data from the second database and the second estimate of the elevation angle of the aerial refueling boom from the EKF.

11. The method of claim 3,
wherein the measured data further includes a hoist-cable tension and
wherein determining the hoist-cable tension data includes determining a drag coefficient for a hoist-cable connected between the aerial refueling boom and the aerial refueling aircraft,
determining a linear force density and aero-drag vector for the hoist-cable,
determining a linear force density perpendicular to the aero-drag vector,
determining an aerial refueling boom hoist cable location and hoist-cable stretchers,
determining an arc-length of the hoist-cable,
determining a hoist-cable spring constant, and
determining the hoist-cable tension from the drag coefficient for the hoist-cable, linear force density and aero-drag vector for the hoist-cable, linear force density perpendicular to the aero-drag vector, aerial refueling boom hoist-cable location, hoist-cable stretchers, arc-length of the hoist-cable, and hoist-cable spring constant.

12. An aerial refueling boom elevation estimation ("ARBEE") system for estimating an elevation angle of an aerial refueling boom on an aerial refueling aircraft, the ARBEE system comprising:
a data collector in signal communication with a storage unit having a first database and a second database, a cable length sensor, a plurality of aerial refueling boom position sensors, and a dynamic pressure sensor;
an optimizer; and
a comparator;
wherein the storage unit is in signal communication with the optimizer and the comparator and the optimizer is also in signal communication with the comparator.

13. The ARBEE System of claim 12,
wherein the data collector is configured to receive measured data signals from the plurality aerial refueling boom position sensors, the cable length sensor, and the dynamic pressure sensor and send the measured data from the received measured data signals to the first database,
wherein the measured data includes measured aerial refueling boom elevation data, measured aerial refueling boom azimuth data, measured dynamic pressure data, and measured hoist cable length data corresponding to a measured aerial refueling boom elevation angle, measured aerial refueling boom azimuth angle, measured dynamic pressure exerted on the aerial refueling boom, and measured hoist cable length of a hoist cable coupled between a hoist on the aerial refueling aircraft and the aerial refueling boom, respectively,
wherein the optimizer is configured to receive the measured data from the first database, optimize it, and store it as optimized data in the second database, wherein the optimized data includes optimized aerial refueling boom elevation data that corresponds to a predicted aerial refueling boom elevation angle that was derived from the measured data,
wherein the comparator is configured to determine the difference between the optimized aerial refueling boom elevation estimation data and the measured aerial refueling boom elevation data to determine an elevation data error, compare the elevation data error to a predetermined threshold value, and send error information to the optimizer if the elevation data error is greater than the predetermined threshold value, wherein the optimizer is configured to utilize the error information to further optimize the measured data and store it as updated optimized data in the second database, and
wherein the elevation angle of the aerial refueling boom is determined from the optimized data.

14. The ARBEE System of claim 13, further including a quantizer in signal communication with the data collector and storage unit, wherein the quantizer is configured to quantize an output from the data collector to produce the measured data.

15. The ARBEE System of claim 14, further including a controller in signal communication with the data collector, storage unit, optimizer, and comparator.

16. The ARBEE System of claim 15, further including a fault detector in signal communication with the storage unit, the plurality of aerial refueling boom position sensors, the cable length sensor, and the dynamic pressure sensor, wherein the fault detector is configured to determine if a fault has occurred in the plurality of aerial refueling boom position sensors.

17. The ARBEE System of claim 16, wherein each aerial refueling boom position sensor of the plurality of aerial refueling boom position sensors is a linear variable differential transformer ("LVDT") position sensor.

18. The ARBEE System of claim 17, further including an extended Kalman filter ("EKF") in signal communication with the fault detector, storage unit, a plurality of inertial measurement units ("IMUs"), the cable length sensor, and the dynamic pressure sensor, wherein the EKF is configured to estimate the aerial refueling boom elevation angle from the measured data signals from the plurality of IMUs that includes angular rate signals and acceleration signals for control of the aerial refueling boom.

19. A method of estimating an elevation angle of an aerial refueling boom on an aerial refueling aircraft, the method comprising:
receiving measured hoist-cable length data corresponding to the hoist-cable length of a hoist-cable extending from the aerial refueling aircraft to the aerial refueling boom; and
determining an aerial refueling boom elevation angle from the measured hoist-cable length data, a first predetermined constant coefficient value, and a second predetermined constant coefficient value,
wherein the first and second predetermined constant coefficient values are determined by performing a polynomial fit on optimized data stored on an optimized data database,
wherein the optimized data, in the optimized data database, corresponds to measured data from a plurality of aerial refueling boom position sensors, a hoist-cable length sensor, and a dynamic pressure sensor, and
wherein the measured data was collected a priori.

20. The method of claim 19,
wherein the collecting the measured data a priori includes
collecting measured data signals from a plurality of aerial refueling boom position sensors, a hoist-cable length sensor, and a dynamic pressure sensor and
generating a measured database of measured data corresponding to the collected measured data signals and
wherein the optimized data is generated by
optimizing the measured data of the measured database to create the optimized database of optimized data corresponding to the measured data, wherein the measured data includes measured aerial refueling boom elevation data and wherein the optimized data includes optimized aerial refueling boom elevation estimation data,
comparing the optimized data to the measured data to determine a difference between the optimized aerial refueling boom elevation data and the measured aerial refueling boom elevation data to determine an elevation data error,
determining if the elevation data error is greater than a predetermined threshold value, and
updating the optimized data if the elevation data error is greater than the predetermined threshold value.

* * * * *